United States Patent [19]
Burns

[11] Patent Number: 5,940,129
[45] Date of Patent: Aug. 17, 1999

[54] METHODS AND SYSTEMS FOR SUPER COMPRESSION OF PRIOR KNOWN OBJECTS IN VIDEO AND FILM

[75] Inventor: Ronnie R. Burns, Irvine, Calif.

[73] Assignee: Hughes Electronics Corporation, El Segundo, Calif.

[21] Appl. No.: 08/761,413

[22] Filed: Dec. 6, 1996

[51] Int. Cl.⁶ .................. H04N 7/12; G06K 9/40
[52] U.S. Cl. .................. 348/395; 348/403; 382/243
[58] Field of Search .................. 348/384, 390, 348/400, 403, 407, 409, 413, 415, 416, 402, 405, 408; 382/190, 232, 236, 238, 243, 248, 250, 276; 358/133, 135, 260, 287; 304/516; H04N 7/30, 7/32; G06K 9/40

[56] References Cited

U.S. PATENT DOCUMENTS

| | | | |
|---|---|---|---|
| 4,196,448 | 4/1980 | Whitehouse et al. | 358/135 |
| 4,454,546 | 6/1984 | Mori | 358/260 |
| 4,809,083 | 2/1989 | Nagano et al. | 358/287 |
| 4,809,350 | 2/1989 | Shimoni et al. | 358/135 |
| 5,063,524 | 11/1991 | Ferre et al. | 364/516 |
| 5,109,451 | 4/1992 | Aono et al. | 358/426 |
| 5,182,642 | 1/1993 | Gersdoff et al. | 358/133 |
| 5,376,971 | 12/1994 | Kadono et al. | 348/699 |
| 5,442,458 | 8/1995 | Rabbani et al. | 348/426 |
| 5,461,680 | 10/1995 | Davis | 358/486 |
| 5,495,539 | 2/1996 | Sieverding | 382/276 |
| 5,581,308 | 12/1996 | Lee | 348/699 |
| 5,590,261 | 12/1996 | Sclaroff et al. | 395/173 |
| 5,638,129 | 6/1997 | Lee | 348/416 |

OTHER PUBLICATIONS

Huang et al., A New Motion Compensation Method For Image Sequence Coding Using Hierarchical Grid Interpolation, IEEE Transactions On Circuits And Systems For Video Technology, vol. 4, No. 1, Feb. 1994, pp. 42–51.

*Primary Examiner*—Bryan Tung
*Assistant Examiner*—Tung Vo
*Attorney, Agent, or Firm*—John A. Crook; Michael W. Sales

[57] ABSTRACT

Methods and systems for compressing data representing a video sequence having a plurality of image frames include obtaining a plurality of basis image frames which represent an anticipated range of motion of at least one object in the video sequence and an actual current image frame and a previous image frame of the at least one object. A plurality of feature points of the at least one object are located in each of the plurality of basis image frames, the previous image frame, and the actual current image frame. A mathematical transformation which maps locations of the feature points in each of the plurality of basis image frames and the previous image frame to locations in the actual current image frame is determined. The mathematical transformation is then encoded for transmission. The methods and systems may also include decoding an encoded mathematical transformation and transforming each of the plurality of basis image frames and the previous image frame in accordance with the mathematical transformation to form an estimated current image frame of the actual current image frame.

34 Claims, 4 Drawing Sheets

METHODS AND SYSTEMS FOR SUPER COMPRESSION OF PRIOR KNOWN OBJECTS IN VIDEO AND FILM

CROSS-REFERENCE TO RELATED APPLICATION

The present invention is related to U.S. Application Ser. No. 08/595,321, filed Feb. 1, 1996, titled Methods and Systems For High Compression Rate Encoding And Decoding Of Quasi-Stable Objects In Video And Film, and assigned to the assignee of the present invention. The disclosure of which is incorporated by reference in its entirety.

TECHNICAL FIELD

The present invention relates to methods and systems for encoding and decoding digital video data.

BACKGROUND ART

Video compression systems are employed to reduce the number of bits needed to transmit and store a digital video signal. As a result, a lower bandwidth communication channel can be employed to transmit a compressed video signal in comparison to an uncompressed video signal. Similarly, a reduced capacity of a storage device, which can comprise a memory or a magnetic storage medium, is required for storing the compressed video signal. A general video compression system includes an encoder, which converts the video signal into a compressed signal, and a decoder, which reconstructs the video signal based upon the compressed signal.

In the design of a video compression system, an objective is to reduce the number of bits needed to represent the digital video signal while preserving its visual content. Current methods and systems for video compression have achieved a reasonable quality of content preservation at a transmission bit rate of 56 kilobits per second. These methods and systems are based upon directly compressing a waveform representation of the digital video signal.

Motion compensation is one approach which is utilized in many video compression schemes. Current approaches model motion in terms of simple displacements of blocks or a global transformation of an entire scene from a reference video frame. A disadvantage of this approach is that reference video frames have to be continuously updated and hence the video compression system must always compress an appreciable number of bits. This is inefficient when the displacements or transformations can be predicted.

SUMMARY OF THE INVENTION

It is therefore an object of the present invention to provide a method and system that encodes a mathematical transform which can be decoded to generate a representative video frame of an actual video frame from a set of anticipated and previous video frames.

It is another object of the present invention to provide an efficient encoding of redundant temporal and spatial data contained within a digital video signal.

It is still a further object of the present invention to provide super compression rates in encoding small motions or deformations of an object of interest.

In carrying out the above objects, the present invention provides a method of compressing data representing a video sequence having a plurality of image frames. The method includes the steps of generating a plurality of basis image frames which represent an anticipated range of motion of the at least one object in the video sequence and obtaining a previous image frame and an actual current image frame of the at least one object. The steps of locating a plurality of feature points of the at least one object in each of the plurality of basis image frames, the previous image frame, and the actual current image frame are then performed. A mathematical transformation which maps locations of the plurality of feature points in each of the plurality of basis image frames and the previous image frame to locations in the actual current image frame is then determined. The mathematical transformation is then encoded for transmission.

Further, in carrying out the above objects, the present invention provides a method of recreating a video sequence having a plurality of image frames. The method may optionally include the step of obtaining at least one previously generated basis image frame which represents an anticipated range of motion of the at least one object in the video sequence. The method also includes obtaining a previous image frame of the at least one object. A step of locating a plurality of feature points of the at least one object in each of the plurality of basis image frames and the previous image frame is then performed. An encoded signal containing an encoded mathematical transformation is then received. The encoded mathematical transformation is decoded to extract a mathematical transformation which maps locations of the plurality of feature points in each of the at least one basis image frame and the previous image frame to locations in an actual current image frame. Each of the at least one basis image frame and the previous image frames are transformed in accordance with the mathematical transformation to form an estimated current image frame of the actual current image frame.

Further in carrying out the above objects, systems are provided which perform the steps of the above-described encoding and decoding methods.

The advantages accruing to the present invention are numerous. For example, the present invention requires only a very low rate coded representation of a mathematical transform representing the image to be transmitted. This reduces the necessary bandwidth of the system since the entire image is not transmitted. Because the present invention is causal and depends only on the current or previous frame of data, the system and method can operate with only a one frame delay making them suitable for teleconferencing applications. The present invention may also provide enhanced image quality by transmitting data representing the difference between the original and generated frame.

These and other features, aspects, and embodiments of the present invention will become better understood with regard to the following description, appended claims, and accompanying drawings.

BEST MODES FOR CARRYING OUT THE INVENTION

Figure 1:
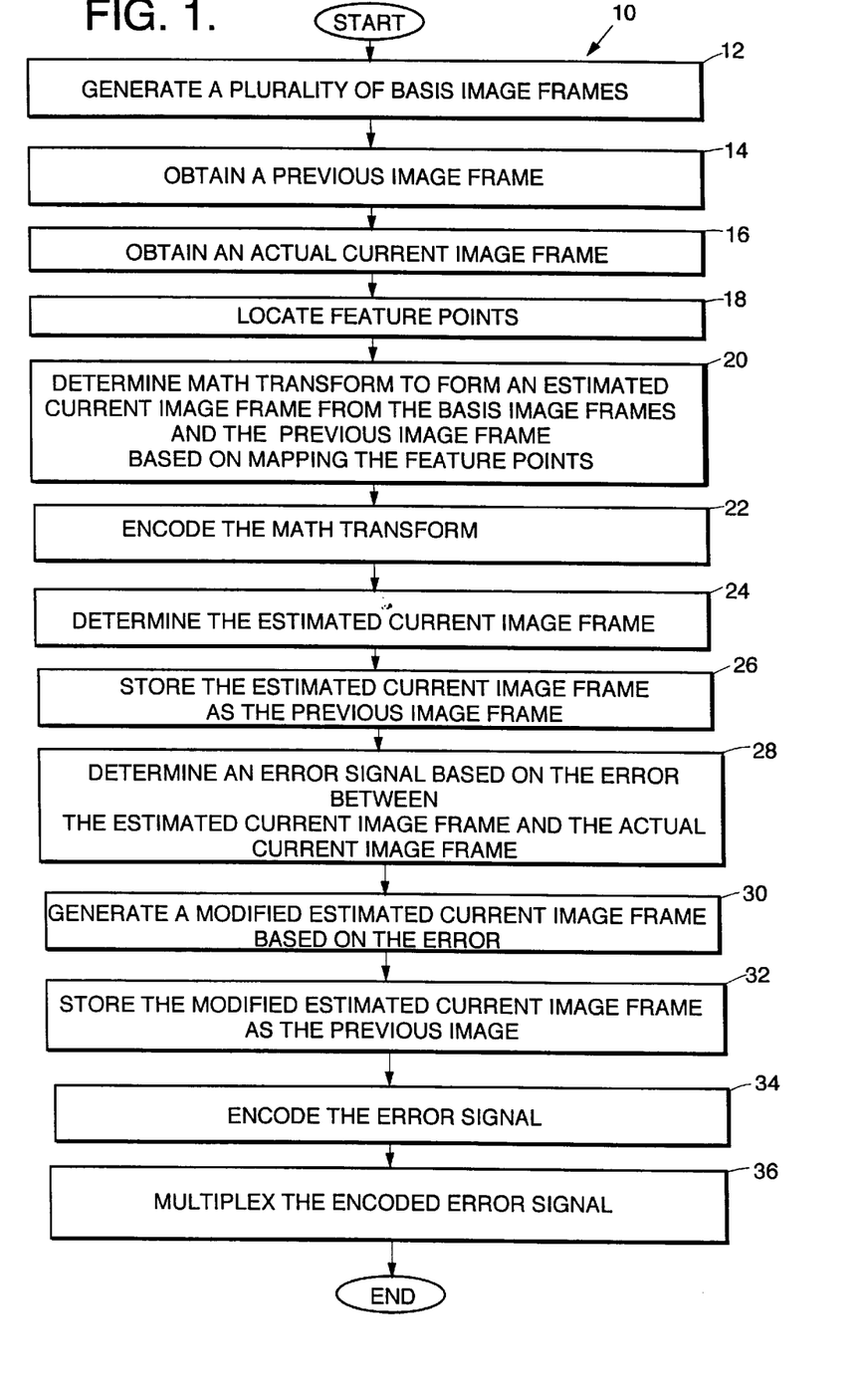
FIG. 1 is a flow diagram of a method of compressing data representing a video sequence having a plurality of image frames.

Referring to FIG. 1, there is shown a flow diagram of a method 10 of encoding a mathematical transform that can be utilized to form an estimated video frame. The estimated video frame is an estimation or a representation of an actual current image frame of at least one object. In general, an image frame is a digitized or bit plane representation frame. An estimated current image frame has a bit plane representation that approximates the actual bit plane representation of the current image frame. As more data is available to describe the estimated current image frame, its resolution is enhanced and it becomes a better approximation to the actual current image frame. Since image frames can be stored in memory, a new image frame can be generated by manipulating or transforming an image frame or a combination of image frames. A feature of the present invention is to generate instructions or mathematical transformations for manipulating anticipated or previous frames to construct an estimated frame which represents an actual frame but is more efficient to transmit and store as explained in detail herein.

As indicated by block 12, method 10 includes a step of generating a plurality of basis image frames of the at least one object in a video sequence. The plurality of basis image frames represent the range of motion anticipated for the at least one object during realtime viewing. For the purpose of this application, an object in an image frame can be representative of a constituent part of the image frame, a region of the image frame, or another entity of interest in the image frame.

As indicated by block 14, the step of obtaining a previous image frame of the at least one object is performed. The previous image frame is a representation of an actual prior image frame.

The actual current image frame is obtained next as shown by block 16. The actual current image frame is a frame ahead (i.e. ahead in time) of the actual prior image frame.

A plurality or grid of feature points of the at least one object is obtained for each of the plurality of basis image frames, the previous image frame, and the actual current image frame as shown in block 18.

A step of determining a mathematical transformation which maps locations of the feature points in each of the plurality of basis image frames and the previous image frame to locations in the actual current image frame is then performed as shown in block 20. In effect, the mathematical transformation estimates a representation of the actual current image frame from the plurality of basis image frames and the previous image frame. Consequently, the mathematical transformation maps the feature points in each of the plurality of basis image frames and the previous image frame to their new location in the actual current image frame.

Of course, a mathematical transformation can be determined to estimate a representation of the actual current image frame from only one basis image frame or previous frame. In this case there would be a comparison between how closely the feature points in each of the plurality of basis image frames and the previous image frame are mapped to their new locations and only the corresponding mathematical transformation would be selected to be used to generate the representation frame of the actual current image frame.

As indicated in block 22, the mathematical transformation is then encoded. This step typically entails encoding one or more formula and parameters. Hence, as indicated in block 24, an estimated current image frame of an actual current image frame can be described by transforming each of the plurality of basis image frames and the previous image frame in accordance with the encoded mathematical transformation. If the plurality of basis image frames and the previous image frame do not need to be encoded to generate the estimated current image frame, a super high compression ratio can be achieved because of the reduced number of bits required to encode a mathematical formula in comparison to encoding detailed pixel image frame data. In essence, the present invention achieves the super compression ratio by encoding only the instruction and none of the pixel frame data.

In general, different types of mathematical transformations may be utilized. For example, the mathematical transformation may be based upon a motion vector representative of translational motion between an anticipated frame (a basis image frame or a previous frame) and an actual current frame. For translational motion of a rigid object, the mathematical transformation would consist of a single motion vector. Alternatively, the mathematical transformation can include an affine transformation representative of a zooming and a panning between the anticipated frame and the actual current frame.

As a further alternative, the mathematical transformation can be a morphing transformation based upon the feature points. A mapping of some number of chosen feature points between two or more anticipated frames is calculated to transform by interpolation these frames to approximate the actual current frame. The mapping may be either linear or non-linear.

After determining the estimated current image frame by transforming each of the plurality of basis image frames and the previous image frame, method 10 proceeds with substituting the estimated current image frame for the previous image frame as shown in block 26. The process then may be repeated by possibly transforming the estimated current image frame to form a new current image frame in accordance with a new mathematical transformation.

In a preferred embodiment of method 10, the realism of the estimated current image frame is increased by a step of determining an error signal based on the error between the estimated current image frame and the actual current image frame as shown in block 28. A modified estimated current image frame is generated by correcting the estimated current image frame based upon the error as shown in block 30. The modified estimated current image frame becomes a closer approximation to the actual current image frame as more error data is available.

As indicated in block 32, the previous image frame is substituted by the modified estimated current image frame. The error signal is then encoded in block 34 for transmission. Of course, depending upon the desired application, the step of determining the error signal and the related steps could be skipped to have a lower cost implementation and to provide a faster processing rate.

All of the encoded data for an object is multiplexed to form a bit stream, as indicated by the step in block 36. The bit stream can be either transmitted to a remote location or stored in a storage device for decoding by a corresponding decoder.

The above-described steps can be repeated for a second actual current image frame, subsequent to the actual current image frame, to form a second bit stream. Consequently, an entire video sequence can be encoded by dividing the video sequence into a plurality of current image frames, and encoding a mathematical transformation for each current image frame in accordance with the above-described method.

Figure 2:
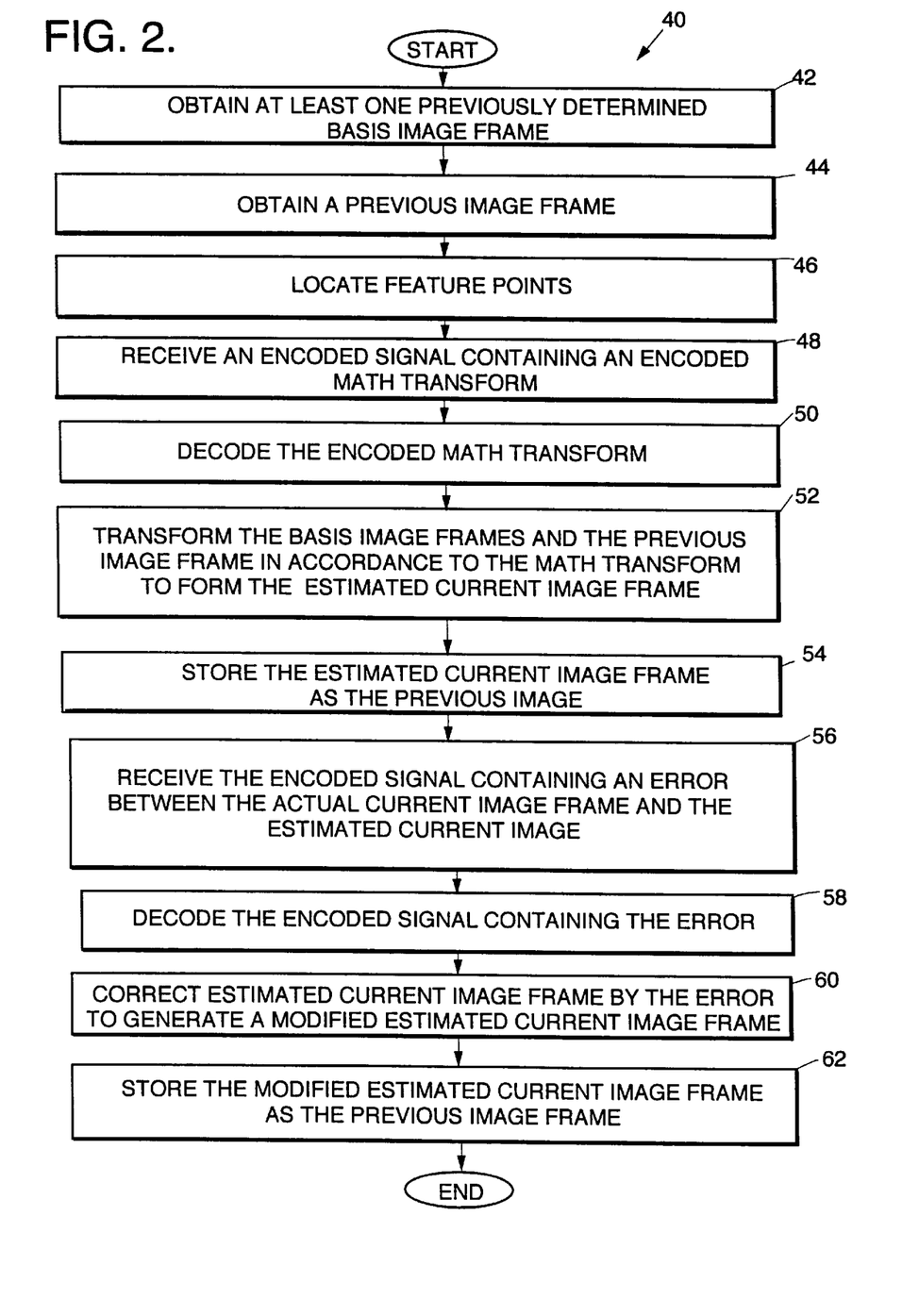
FIG. 2 is a flow diagram of a method of recreating a video sequence having a plurality of image frames.

Referring now to FIG. 2, there is shown a flow diagram of a method 40 for decoding a mathematical transform to form an estimated current image frame. Method 40 includes many of the same steps as method 10 shown in FIG. 1.

An optional step of obtaining at least one basis image frame of the at least one object in the video sequence is indicated by block 42. Preferably, the basis image frames generated by the method illustrated in FIG. 1 are transmitted to the receiver/decoder unit. For proper operation, both the transmitter and receiver must have the same set of basis image frames. For teleconferencing applications, the basis image frames may be transmitted during initialization of the call so that transmissions during the call represent near real-time movements of the participants.

Other steps illustrated in FIG. 2 which are similar to those described with reference to FIG. 1 include: a step of obtaining a previous image frame of the at least one object as indicated by block 44; and a step of obtaining a plurality of feature points in each of the plurality of basis image frames, the previous image frame, and the actual current image frame as indicated in block 46.

After performing the above described steps, method 40 proceeds with a step of receiving an encoded signal containing the encoded mathematical transformation as indicated in block 48. As introduced above, the mathematical transformation maps locations of the feature points in each of the plurality of basis image frames and the previous image frame to locations in the actual current image frame. After receiving the encoded mathematical transformation it is decoded as shown in block 50.

Proceeding to block 52, a step of transforming the at least one basis image frame, if utilized, and the previous image frame in accordance with the mathematical transformation to form an estimated current image frame corresponding to the actual current image frame is performed. The previous image frame is then substituted with the estimated current image frame as shown in block 54.

In a preferred embodiment, method 40 includes a step of receiving an encoded error signal as shown in block 56. The encoded error signal contains an error signal based on the difference between the actual current image frame and the estimated current image frame. The encoded error is decoded as shown in block 58. The estimated current image frame is then corrected based upon the error to generate a modified estimated current image frame as indicated in block 60. Subsequently, the previous image frame is substituted with the modified estimated current image frame as shown in block 62.

Figure 3:
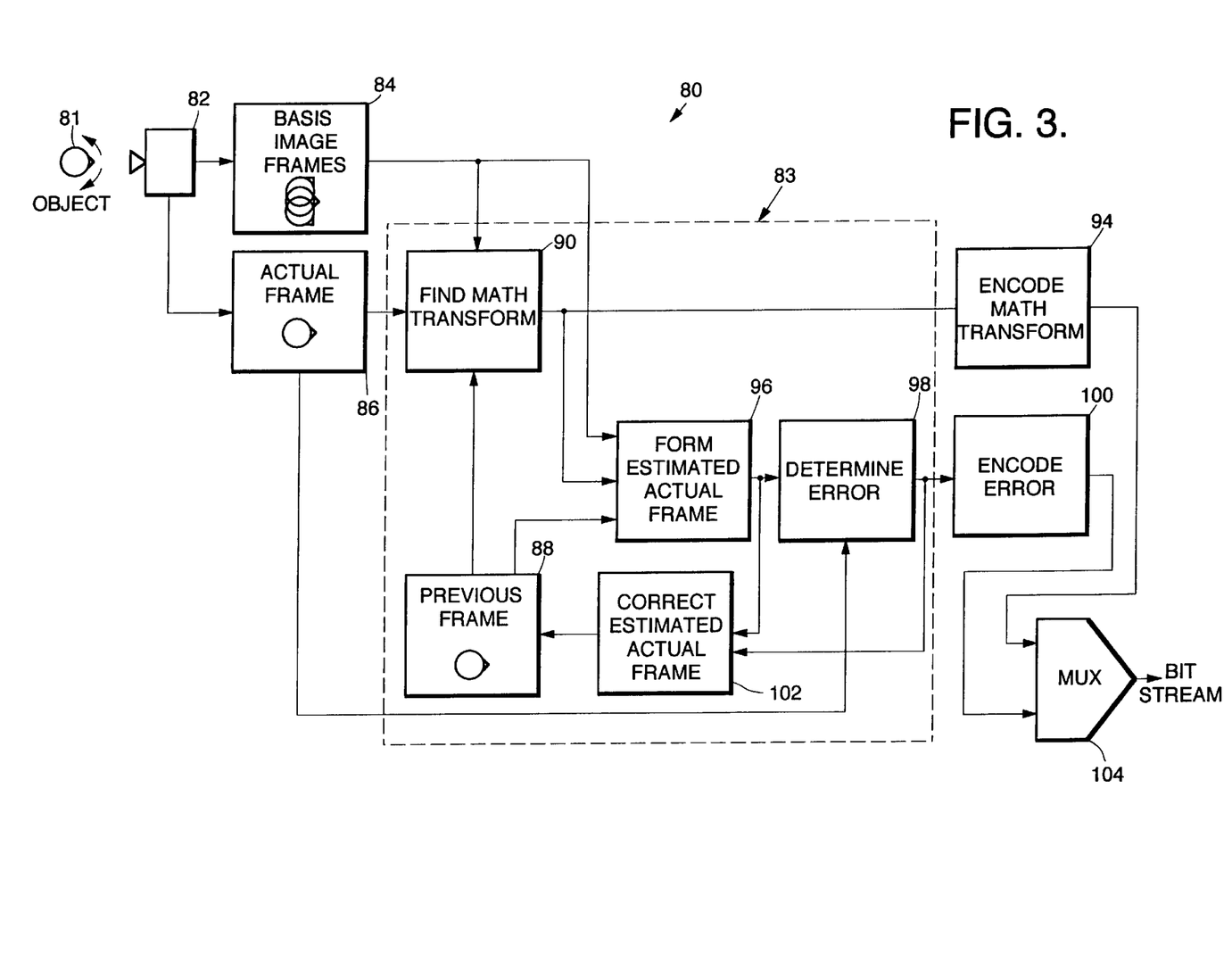
FIG. 3 is a block diagram of a system for compressing data representing a video sequence having a plurality of image frames.

Referring now to FIG. 3, a block diagram of a system 80 for encoding a mathematical transform that can be utilized to form an estimated video frame is shown. System 80 includes a digitizing camera 82 and an image processor 83. Digitizing camera 82 is operative to generate a plurality of basis image frames 84 which represent an anticipated range of motion of at least one object 81 in a video sequence and to obtain an actual current image frame 86 of the at least one object 81.

Image processor 83 is operative to obtain a previous image frame 88 of the at least one object 81. Image processor 83 is operatively associated with digitizing camera 82 to locate a plurality of feature points of the at least one object 81 in each of the plurality of basis image frames 84, actual current image frame 86, and previous image frame 88.

The step of locating the plurality of feature points is performed in block 90. Image processor 83 is further operative to determine a mathematical transformation in block 90. As described earlier herein, mathematical transformation 90 maps locations of the feature points in each of plurality of basis image frames 84 and previous image frame 88 to locations in actual current image frame 86. An encoder 94 encodes the mathematical transformation.

After determining the mathematical transformation, image processor 83 transforms each of the plurality of basis image frames 84 and previous image frame 88 in accordance with the mathematical transformation of block 90 to form an estimated current image frame 96 of actual current image frame 86. As described herein, estimated current image frame 96 is an approximation of actual current image frame 86. Image processor 83 substitutes estimated current image frame 96 for previous image frame 88.

As indicated in block 98, an error between actual current image frame 86 and estimated current image frame 96 is then determined. The error is encoded by an error encoder 100. Image processor 83 generates a modified estimated current image frame 102 by correcting estimated current image frame 96 based upon the error in block 98. Image processor 83 substitutes previous image frame 88 with modified estimated current image frame 102.

Encoder 94 and error encoder 100 are applied to a multiplexer 104 to form a bit stream. The bit stream can be transmitted to a receiver for decoding the bit stream to produce an estimated current image frame of the actual current image frame. A subsequent mathematical transformation can be encoded in a similar manner to form a second bit stream. Modified estimated current image frame 102 may be used to form the new mathematical transformation and, subsequently, it will be substituted according to the preceding steps. Generating mathematical transformations may be repeated for other subsequent actual current image frames to form an entire video sequence.

Figure 4:
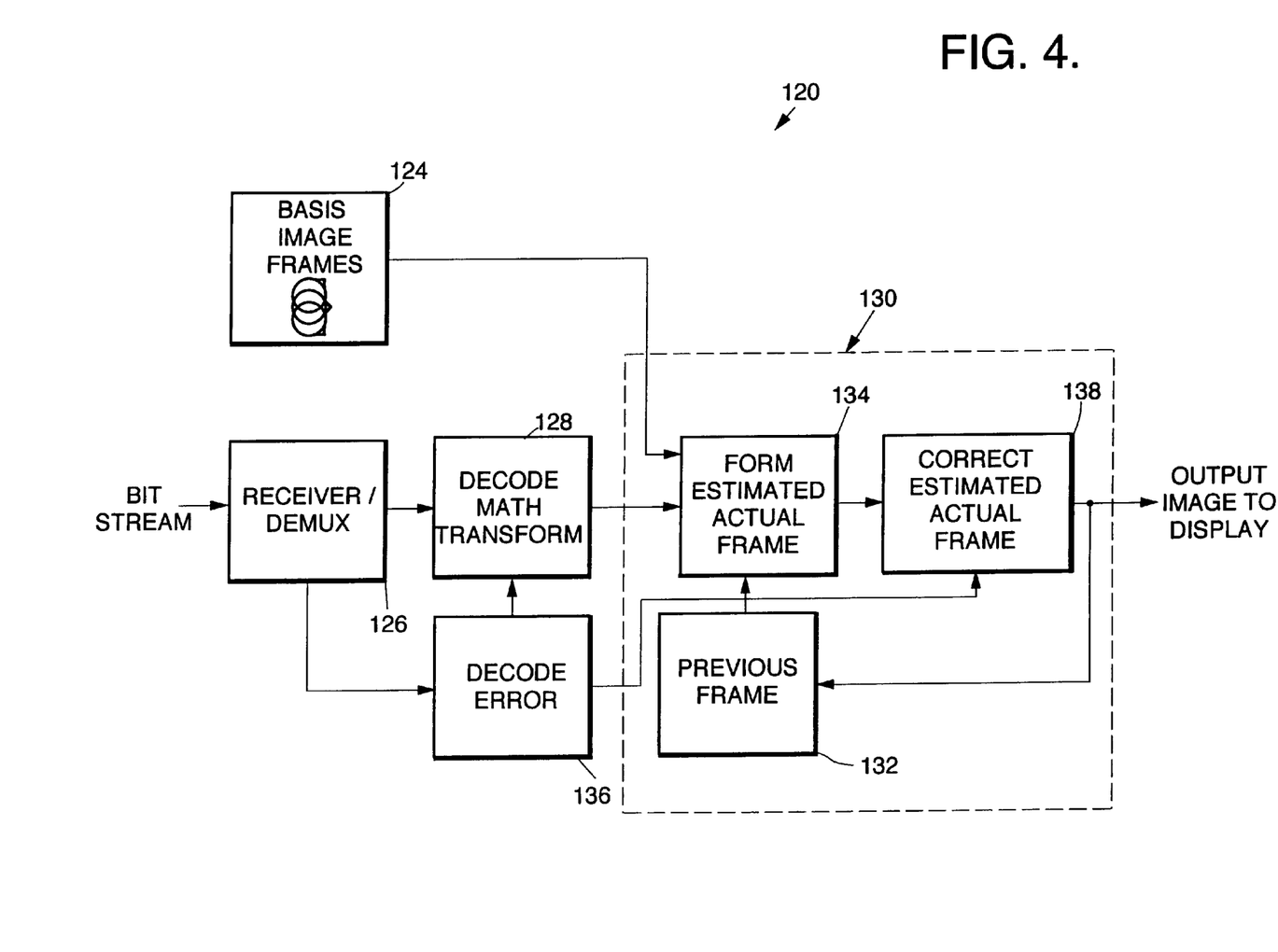
FIG. 4 is a block diagram of a system for recreating a video sequence having a plurality of image frames.

Referring now to FIG. 4, a block diagram of a system 120 for decoding an encoded mathematical transform to form an estimated current image frame is shown. System 120 obtains a plurality of previously determined basis image frames 124 which represent an anticipated range of motion of at least one object 121 in a video sequence. Of course, system 120 could receive the plurality of basis image frames 124 from a transmitting station or an encoder prior to or at the beginning of a viewing session of the at least one object 121 as previously described. System 120 may use receiver 126 and decoder 128 to receive and decode basis image frames from the transmitting station.

After the basis image frames have been established so that the receiver and transmitter each have at least one basis image frame in common, receiver 126 receives an encoded signal containing an encoded mathematical transformation. A first decoder 128 is coupled to receiver 126 to decode the encoded mathematical transformation to extract a mathematical transformation which maps locations of feature points in each of the plurality of basis image frames 124 and a previous image frame to locations in an actual current image frame.

An image processor 130 is operative to store a previous image frame 132 of the at least one object 121. Image processor 130 transforms each of the plurality of basis image frames 124 and previous image frame 132 in accordance with the mathematical transformation to form an estimated current image frame of the actual current image frame as indicated in block 134. Estimated current image frame 134 can be displayed for view on a display device (not specifically illustrated) if desired. Image processor 130 then stores estimated current image frame 134 as previous frame 132.

Optionally, the encoded signal contains an encoded error signal. The error signal is the error between the actual current image frame and the estimated current image frame. A second decoder 136 decodes the encoded error signal from receiver 126. Image processor 130 generates a modified estimated current image frame by correcting the estimated current image frame based upon the error as indicated in block 138. Image processor 130 then stores modified estimated current image frame 138 as previous image frame 132.

As previously indicated, the above-described embodiments of the present invention have many advantages. By describing rigid or quasi-rigid object motions by means of a transformation which maps a predicted frame or a previous frame into the current frame's configuration, embodiments of the present invention provide an efficient encoding method of redundant temporal data in digital video or film data.

Since the mathematical transformation can describe an estimated current frame based upon the predicted frames and the previous frame, the information that needs to be transmitted to reconstruct the estimated current frame is greatly reduced. Hence, a super high compression ratio is achieved by not having to transmit redundant, detailed pixel data. In essence, none of the pixel data needs to be transmitted.

The realism of the estimated current frame can be improved by transmitting error data between the estimated current frame and the actual current frame. The realism can be improved to the extent that the data rate allows transmission of the residual bits required to encode the error.

An object being viewed may be one of many objects in a complex scene An "alpha map" which specifies the transparency of the object can be associated with the object and then a number of such objects may be multiplexed together to represent the complex scene. Furthermore, the plurality of basis image frames can be updated periodically during realtime viewing. However, this would require a substantial increase in bit rate if these images were transmitted from an encoder to a decoder.

Embodiments of the present invention are well suited for use in applications such as televideoconferencing or information videos having a "talking head" which remains essentially the same during the sequence of interest, and undergoes only small movements and deformations. Other uses include other multimedia motion information video image delivery systems with appropriate source models such as speech delivery or similar type talking head sequences.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of compressing data representing a video sequence having a plurality of image frames, the method comprising:

generating a plurality of basis image frames which represent an anticipated range of motion of at least one object in the video sequence;

obtaining a previous image frame of the at least one object;

obtaining an actual current image frame of the at least one object;

locating a plurality of feature points of the at least one object in each of the plurality of basis image frames, the previous image frame, and the actual current image frame;

determining a mathematical transformation which maps locations of the plurality of feature points in each of the plurality of basis image frames and the previous image frame to locations in the actual current image frame; and encoding the mathematical transformation for transmission.

2. The method of claim 1 further comprising:

transforming each of the plurality of basis image frames and the previous image frame in accordance with the mathematical transformation to form an estimated current image frame of the actual current image frame; and substituting the estimated current image frame for the previous image frame.

3. The method of claim 2 further comprising:

determining an error between the actual current image frame and the estimated current image frame;

generating a modified estimated current image frame by correcting the estimated current image frame based upon the error; and encoding the error between the actual current image frame and the estimated current image frame for transmission.

4. The method of claim 3 further comprising substituting the modified estimated current image frame for the previous image frame.

5. The method of claim 1 further comprising:

receiving an encoded signal containing the encoded mathematical transformation;

decoding the encoded mathematical transformation to extract the mathematical transformation; and transforming each of the plurality of basis image frames and the previous image frame in accordance with the mathematical transformation to form an estimated current image frame of the actual current image frame.

6. The method of claim 5 further comprising substituting the estimated current image frame for the previous image frame.

7. The method of claim 5 further comprising:

receiving an encoded signal containing an encoded error;

decoding the encoded error to extract an error between the actual current image frame and the estimated current image frame; and correcting the estimated current image frame based upon the error to generate a modified estimated current image frame.

8. The method of claim 7 further comprising substituting the modified estimated current image frame for the previous image frame.

9. The method of claim 1 wherein the mathematical transformation is a morphing transformation based upon the plurality of feature points.

10. A system for compressing data representing a video sequence having a plurality of image frames, the system comprising:

a digitizing camera operative to generate a plurality of basis images which represent an anticipated range of motion of at least one object in the video sequence and to obtain an actual current image frame of the at least one object;

an image processor operative to obtain a previous image frame of the at least one object, the image processor being operatively associated with the digitizing camera to locate a plurality of feature points of the at least one object in each of the plurality of basis image frames, the actual current image frame, and the previous image frame, the image processor further operative to determine a mathematical transformation which maps locations of the plurality of feature points in each of the plurality of basis image frames and the previous image frame to locations in the actual current image frame; and an encoder coupled to the image processor to encode the mathematical transformation for transmission.

11. The system of claim 10 wherein the image processor is further operative to transform each of the plurality of basis image frames and the previous image frame in accordance with the mathematical transformation to form an estimated current image frame of the actual current image frame.

12. The system of claim 11 wherein the image processor is further operative to store the estimated current image frame as the previous image frame.

13. The system of claim 11 wherein the image processor is further operative to determine an error between the actual current image frame and the estimated current image frame, and to generate a modified estimated current image frame by correcting the estimated current image frame based upon the error.

14. The system of claim 13 further comprising an error encoder to encode the error between the actual current image frame and the estimated current image frame for transmission.

15. The system of claim 13 wherein the image processor is further operative to store the modified estimated current image frame for the previous image frame.

16. The system of claim 10 further comprising:

a receiver to receive an encoded signal containing the encoded mathematical transformation; and a first decoder which decodes the encoded mathematical transformation to extract the mathematical transformation;

the image processor is further operative to transform each of the plurality of basis image frames and the previous image frame in accordance with the mathematical transformation to form an estimated current image frame of the actual current image frame.

17. The system of claim 16 wherein the image processor is further operative to store the estimated current image frame as the previous frame.

18. The system of claim 16 wherein the encoded signal contains an error between the actual current image frame and the estimated current image frame.

19. The system of claim 18 further comprising a second decoder which decodes the encoded signal containing the error.

20. The system of claim 19 wherein the image processor is further operative to generate a modified estimated current image frame by correcting the estimated current image frame based upon the error.

21. The system of claim 20 wherein the image processor is further operative to store the modified estimated current image frame for the previous image frame.

22. The system of claim 10 wherein the mathematical transformation is a morphing transformation based upon the plurality of feature points.

23. A method of recreating a video sequence having a plurality of image frames, the method comprising:

obtaining at least one previously determined basis image frame which represents an anticipated range of motion of at least one object in the video sequence;

obtaining a previous image frame of the at least one object;

locating a plurality of feature points of the at least one object in each of the at least one previously determined basis image frame and the previous image frame;

receiving an encoded signal containing an encoded mathematical transformation;

decoding the encoded mathematical transformation to extract a mathematical transformation which maps locations of the plurality of feature points in each of the plurality of basis image frames and the previous image frame to locations in an actual current image frame; and transforming each of the plurality of basis image frames and the previous image frame in accordance with the mathematical transformation to form an estimated current image frame of the actual current image frame.

24. The method of claim 23 further comprising the step of substituting the estimated current image frame for the previous image frame.

25. The method of claim 23 further comprising the steps of:

receiving an encoded signal containing an encoded error;

decoding the encoded error to extract an error between the actual current image frame and the estimated current image frame; and correcting the estimated current image frame based upon the error to generate a modified estimated current image frame.

26. The method of claim 25 further comprising the step of substituting the modified estimated current image frame for the previous image frame.

27. The method of claim 23 wherein the mathematical transformation is a morphing transformation based upon the plurality of feature points.

28. A system for recreating a video sequence having a plurality of image frames based on at least one previously determined basis image frame, the system comprising:

a receiver to receive an encoded signal containing an encoded mathematical transformation;

a first decoder which decodes the encoded mathematical transformation to extract a mathematical transformation which maps locations of feature points in each of the at least one previously determined basis image frame and a previous image frame to locations in an actual current image frame; and an image processor operative to obtain the previous image frame of the at least one object, the image processor locating a plurality of feature points of the at least one object in each of the at least one previously determined basis image frame and the previous image frame, the image processor further operative to transform each of the at least one previously determined basis image frame and the previous image frame in accordance with the mathematical transformation to form an estimated current image frame of the actual current image frame.

29. The system of claim 28 wherein the image processor is further operative to store the estimated current image frame as the previous frame.

30. The system of claim 28 wherein the encoded signal contains an encoded error.

31. The system of claim 30 further comprising a second decoder which decodes the encoded error to extract an error between the actual current image frame and the estimated current image frame.

32. The system of claim 31 wherein the image processor is further operative to generate a modified estimated current image frame by correcting the estimated current image frame based upon the error.

33. The system of claim 32 wherein the image processor is further operative to store the modified estimated current image frame as the previous image frame.

34. The system of claim 28 wherein the mathematical transformation is a morphing transformation based upon the plurality of feature points.

* * * * *